(12) United States Patent
Hashimoto et al.

(10) Patent No.: US 6,926,250 B1
(45) Date of Patent: Aug. 9, 2005

(54) VALVE DRIVING DEVICE

(75) Inventors: Katsuo Hashimoto, Nagano-ken (JP); Shigeru Ozawa, Nagano-ken (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 57 days.

(21) Appl. No.: 10/363,077

(22) PCT Filed: Jul. 8, 2002

(86) PCT No.: PCT/JP02/06885

§ 371 (c)(1),
(2), (4) Date: Aug. 18, 2003

(87) PCT Pub. No.: WO03/006860

PCT Pub. Date: Jan. 23, 2003

(30) Foreign Application Priority Data

Jul. 10, 2001 (JP) .............................. 2001-209218

(51) Int. Cl.⁷ ............................................. F16K 31/02
(52) U.S. Cl. ................................. 251/129.11; 251/208
(58) Field of Search ............................ 251/205, 208, 251/129.11; 137/883

(56) References Cited

U.S. PATENT DOCUMENTS

| | | | |
|---|---|---|---|
| 1,912,295 A | | 5/1933 | Mintz |
| 2,351,732 A | | 6/1944 | Almond et al. |
| 4,438,781 A | * | 3/1984 | Brenholt ...................... 251/205 |
| 4,440,382 A | * | 4/1984 | Pruvot et al. ................ 251/208 |
| 4,962,912 A | * | 10/1990 | Stoll .......................... 251/208 |
| 5,417,083 A | * | 5/1995 | Eber .......................... 251/208 |
| 5,476,246 A | * | 12/1995 | Wendel et al. .......... 251/129.11 |
| 5,685,493 A | * | 11/1997 | Grytz et al. ............ 251/129.21 |
| 6,231,028 B1 | * | 5/2001 | Hirata et al. ........... 251/129.11 |
| 6,318,702 B1 | * | 11/2001 | Hettel et al. .................. 251/64 |

FOREIGN PATENT DOCUMENTS

| | | |
|---|---|---|
| DE | 38 20 855 | 8/1989 |
| DE | 196 35 614 | 4/1998 |
| EP | 0 514 838 | 11/1992 |
| FR | 2 565 658 | 12/1985 |
| GB | 2 092 271 | 6/1982 |
| GB | 2 270 964 | 3/1994 |

* cited by examiner

*Primary Examiner*—John Bastianelli
(74) *Attorney, Agent, or Firm*—Hogan & Hartson, LLP (57) ABSTRACT

A valve driving device includes a plurality of valve bodies that are simultaneously driven. Driven gears are disposed symmetrically with respect to an axis of the a common gear. Rubber valve bodies which are separate from the driven gears are disposed on the lower surfaces of the driven gears. The valve bodies are slidably aligned with a valve seat which is formed by smoothly denting a valve seat plate. The driven gears are brought into contact with the valve seat under pressure by one leaf spring member to open or close communication holes (valve openings) thereby interrupting or opening a flow-path from an inflow hole.

6 Claims, 10 Drawing Sheets

FIG.12
Prior Art

VALVE DRIVING DEVICE

TECHNICAL FIELD

The present invention relates to a valve driving device for controlling open/close operation of a flow-path of fluid, for example, a structure of a multi-way valve (electric expansion valve) for controlling a flow rate of refrigerant of a heat pump type refrigeration cycle or switching passages.

BACKGROUND ART

Figure 11:
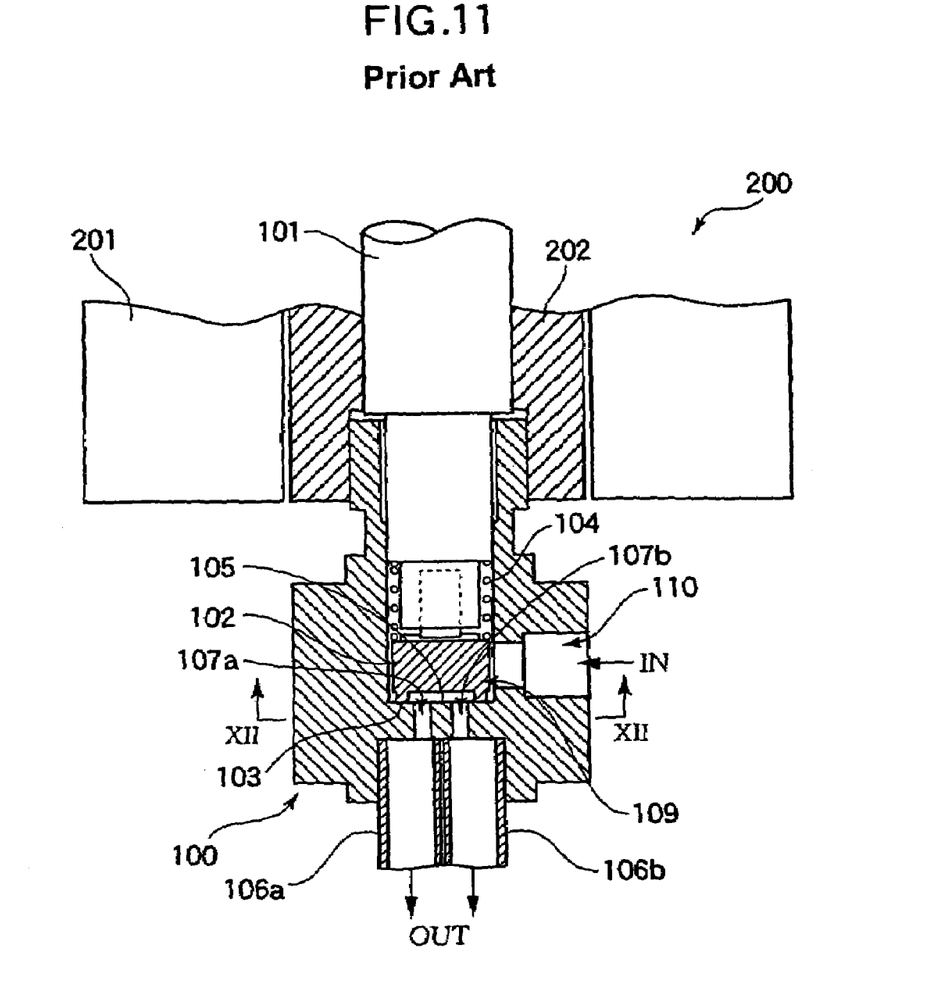
FIG. 11 is a schematic partial sectional view showing one example of a conventional electric expansion valve.
Figure 12:
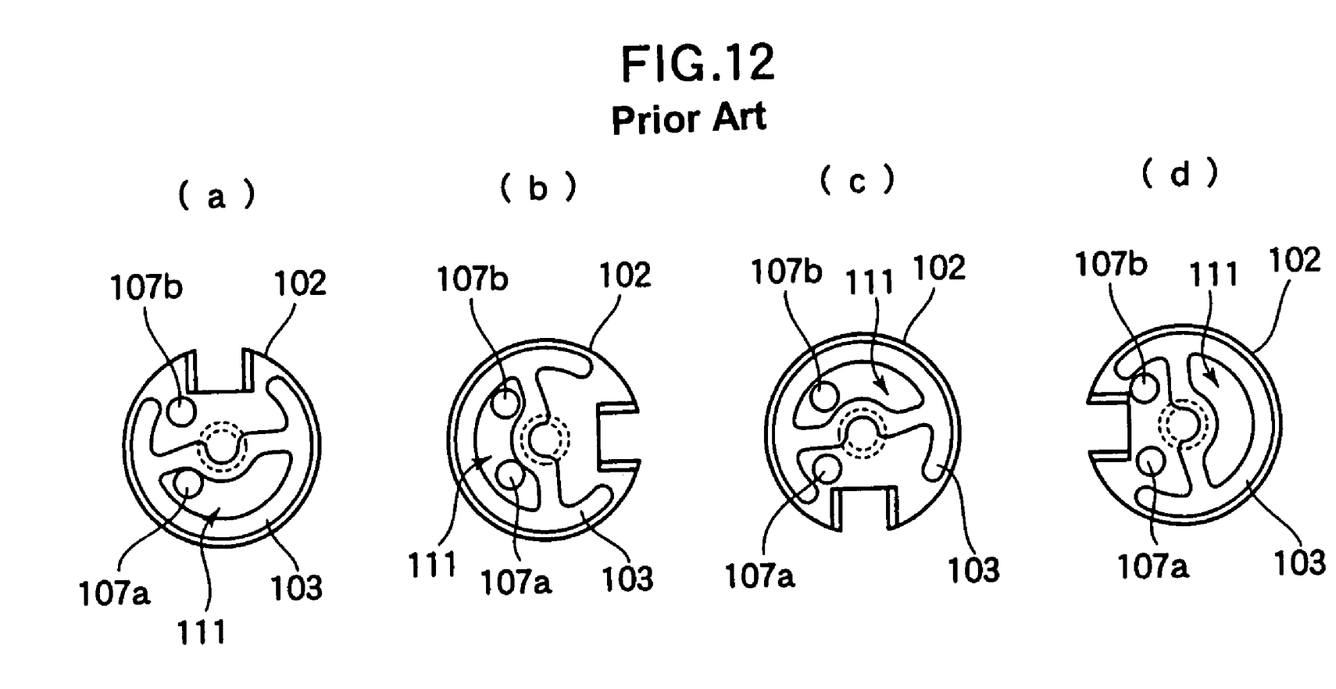
FIG. 12 are explanatory views of an open/close mode of the electric expansion valve shown in FIG. 9.

Various microprocessor-controlled electric expansion valves using stepping motors have been devised. FIG. 11 is a schematic partial sectional view of one example of a motor type refrigerant three-way valve (cross valve). FIG. 12 are plan views of an open/close state of the valve taken along a line XII—XII in FIG. 11. A three-way valve 100 is provided directly below a stepping motor shown with a reference numeral 200 concentrically with the stepping motor 200, and a rotor 202 is driven by controlling current of a stator 201. The rotor 202 is integrally provided with a rotating shaft 101, and a resin valve body 102 which rotates integrally with the rotating shaft 101 is slidably and concentrically connected an lower end of the rotating shaft 101. A rib 103 projects from a lower surface of the valve body 102, and the rib 103 is contacted to a valve seat 105 under pressure by a compression spring 104.

Communication holes 107a and 107b which are in communication with two pipes 106a and 106b are formed in the valve seat 105 such as to open in a valve chamber 109, the communication holes 107a and 107b are selectively brought into communication with an inflow hole 110 through the valve body 102 in the valve chamber 109. As shown in FIG. 12, the rib 103 has such a shape that surrounds a semicircular recess 111, and one valve body 102 switches a partition of the communication holes 107a and 107b in four modes in accordance with the rotation angle of the rotating shaft 101. That is, if one or both of the communication holes 107a and 107b provided at close two locations are surrounded by the semicircular recess 111, flow between the communication hole and the inflow hole 110 is cut off (closed), and the four modes of open/close states of the communication holes 107a and 107b at two locations shown in FIG. 12 can be selected by rotation angle of the rotating shaft 101.

FIG. 12(a) shows that the communication hole 107a is closed and the communication hole 107b is opened. FIG. 12(b) shows that both the communication holes 107a and 107b are closed. FIG. 12(c) shows that the communication hole 107a is opened and the communication hole 107b is closed. FIG. 12(d) shows that both the communication holes 107a and 107b are opened. In this manner, the valve body 102 is provided concentrically with the motor rotating shaft 101, the valve seat 105 is allowed to rotate under pressure at the same speed as that of the rotating shaft 101, and the four modes of the two communication holes 107a and 107b are switched.

The valve body 102 is rotated concentrically with the rotating shaft 101. The valve body 102 is forcibly rotated against a crimping load caused by a spring 104 which prevents medium from leaking. For this reason, a material of the valve body 102 is limited to those having excellent wear resistance, a thickness of the valve body 102 must be thick for ensuring strength. That is, the valve body 102 can not be designed while assigning the highest priority to adhesion with respect to the valve seat. Therefore, it is not possible to sufficiently select a material which easily adheres. Further, when the valve body 102 is made of resin or the like, a sink mark caused by molding becomes big, and precision with respect to an adhering surface can not be secured.

In view of the above problem, it is an object of the present invention to provide a valve driving device in which a valve seat of a valve body which interrupts or permits the flow of fluid by tightly contacting with an opening peripheral edge and opening or closing an opening can be designed while assigning the highest priority to adhesion to the valve seat, and the valve body can tightly contact the valve seat without increasing a valve-crimping load.

DISCLOSURE OF THE INVENTION

To achieve the above object, the present invention provides a valve driving device comprising: an opening having an inflow pipe into which fluid flows and an outflow pipe from which fluid flows, the inflow pipe and outflow pipe forming a portion of a flow-path and being connected to an interior of the opening; a valve body which is brought into tight contact with a peripheral edge of the opening and is rotated to open or close the opening, thereby interrupting or permitting the flow of the fluid; and driving means for driving the valve body, wherein a rear gear of a front and rear gear train transmits an output of the driving means, the valve body is formed separately from the rear gear and is held on an axial end surface of the rear gear, and the valve body rotates the rear gear to open or close the fluid flow-path. According to the present invention, since the valve body is formed separately from the driven gear, it is possible to design the valve body while assigning the highest priority to adhesion with respect to the valve seat. When a material which can easily adhere is selected or the valve body is formed of resin or rubber, it is possible to select its shape while taking a sink mark which may be caused by molding into consideration, the contact portion can be formed into uniform shape and thickness. Therefore, precision of the adhering surface can be secured.

The valve body is made of rubber or equivalent synthetic resin. Especially, according to the invention, since the volume of the valve body can be reduced, NBR or NBR hydride which can withstand the change of kinds of refrigerant or using pressure can be used for the valve body. Further, since the opening is closed by the rib, the sliding area between the projecting surface of the rib and the valve body can be reduced to increase the pressure, and the adhesion can be enhanced. Furthermore, the valve driving device further comprises at least one more opening, each of the opening has the valve body each having a gear, a common gear always mesh with all of the gears, the gears are disposed symmetrically with respect to a rotating shaft of the common gear, and the valve driving device further comprises an elastic member which commonly biases the gears. It becomes easier to uniformly bias the gears, a deviated load of the common gear is avoided so that the gear can rotate smoothly. Moreover, the valve body has a central space portion whose diameter is greater than an outer diameter of the supporting shaft. Therefore, it is possible to maintain the adhesion of the sliding surface without affected by swell of the plate when the supporting shaft is press-fitted, and by ooze of welding braze.

BRIEF DESCRIPTION OF THE DRAWINGS

FIG. 3 are detail views of the driven gear of the valve driving device of the invention, wherein FIG. 3(a) is a plan view, FIG. 3(b) is a sectional view taken along a line b—b in FIG. 3(a), and FIG. 3(c) is a back view taken along a line c—c in FIG. 3(b).

FIG. 4 are detail views of the valve body of the valve driving device of the invention, wherein FIG. 4(a) is a plan view, FIG. 4(b) is a sectional view taken along a line b—b in FIG. 4(a), and FIG. 4(c) is a back view taken along a line c—c in FIG. 4(b).

FIG. 6 are detail views of a leaf spring member in the valve driving device of the invention, wherein FIG. 6(a) is a plan view and FIG. 6(b) is a side view.

FIG. 8 show another leaf spring member in the valve driving device of the invention, wherein FIG. 8(a) is a plan view and FIG. 8(b) is a sectional view taken along a line b—b in FIG. 8(a).

FIG. 10 show a leaf spring member applied to a four-way valve in the valve driving device of the invention, wherein FIG. 10(a) is a plan view and FIG. 10(b) is a sectional view taken along a line b—b in FIG. 10(a).

BEST MODE FOR CARRYING OUT THE INVENTION

Figure 1:
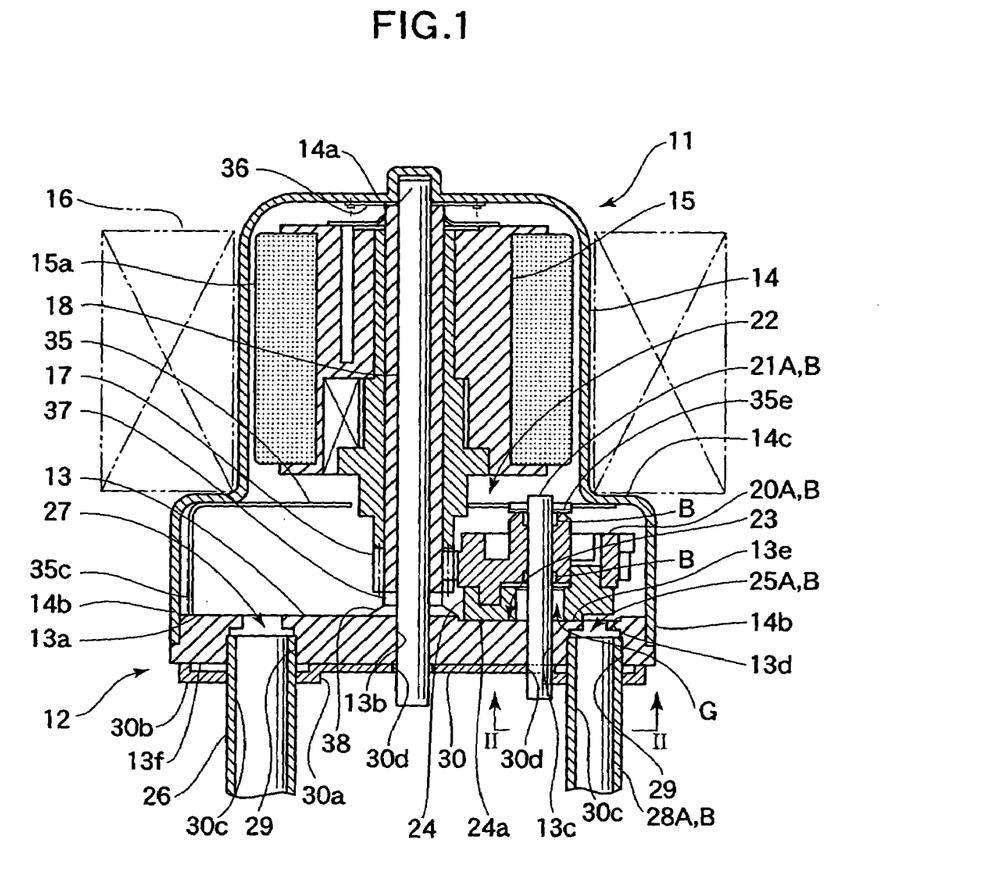
FIG. 1 is a side sectional view of an embodiment of a valve driving device according to the present invention.

An embodiment of a valve driving device according to the present invention will be explained below based on the drawings. FIG. 1 is an enlarged vertical side sectional view of an example of the valve driving device 11 of the invention applied to a three-way valve 12. The valve driving device 11 is constructed on a press-formed metal valve seat plate 13 and is hermetically sealed by a hermetically sealed case 14. A rotor 15 is provided in the hermetically sealed case 14. A stator 16 (schematically shown with phantom line) is in tight contact with an outer side of the hermetically sealed case 14 such as to surround the case 14. A driving signal is input to the stator 16 from a computer (not shown) to control the rotation/stop at a predetermined angle of the rotor 15.

The rotor 15 is integrally provided at its outer periphery with magnets 15a. A pinion 17 is formed on an end of the rotor 15 closer to the valve seat plate 13. The rotor 15 is rotatably supported by a fixed rotor supporting shaft 18. A diameter of the hermetically sealed case 14 is reduced such that an outer peripheral surface of the magnet 15a of the rotor 15 and an inner peripheral surface of the stator 16 are adjacent to each other. The hermetically sealed case 14 is provided at its closed end with a recess 14a. One end of the supporting shaft 18 of the rotor 15 is fitted into the recess 14a to support the supporting shaft 18 stably. The diameter of the hermetically sealed case 14 on the side of the opened end 14b is increased to form a step 14c on which the stator 16 is placed. An inner surface of the diameter-increased opened end 14b is tightly fitted over a reduced-diameter peripheral edge portion 13a of a stepped outer periphery of the valve seat plate 13. If the opened end 14b of the hermetically sealed case 14 is fitted over the reduced-diameter peripheral edge portion 13a of the valve seat plate 13, a center hole 13b of the valve seat plate 13 and a fixed shaft supporting recess 14a of the hermetically sealed case 14 are concentrically aligned with each other.

Fixing holes 13c of supporting shafts 21A and 21B of two driven gears 20A and 20B (see FIG. 5) which mesh with the rotor pinion 17 as a common gear are formed in two positions of the valve seat plate 13 on the opposite sides of the center hole 13b. The driven gears 20A and 20B are rotatably supported by the supporting shafts 21A and 21B. A step 13d is press-formed on the valve seat plate 13 at a circular boundary having slightly larger than outer diameters of the driven gears 20A and 20B around the driven gear supporting shaft fixing hole 13c, and a smooth flat surface 13e is dented in the circle to form a valve seat 23 (see FIG. 1). With this structure, it is possible to set surface relative roughness of the valve seat 23 which abuts against the sliding surface 24a that has a predetermined pattern and that is projected on the valve body 24 connected to lower surfaces of the driven gears 20A and 20B, within a limited range.

Communication holes 25A and 25B are formed in necessary positions in a circle which defines the two valve seats 23, thereby forming valve openings. Another communication hole 27 (see FIG. 5) which is in communication with an inflow pipe 26 is formed at an appropriate position on a radius line which intersects at right angles with a line connecting these communication holes (valve openings) 25A and 25B. These communication holes 25A and 25B are brought into communication with bottomed holes 29 which are formed by shallowly denting the pipe-mounting surface 13f that is on the opposite side from the valve seat 23 and in which first and second outflow pipes 28A and 28B are fitted.

A pipe supporting plate 30 is fixed to the pipe-mounting surface 13f provided with the bottomed hole 29 on the opposite side from the valve seat 23 of the valve seat plate 13. The press-formed pipe supporting plate 30 is a thin metal plate. Three portions of the pipe supporting plate 30 including the inflow pipe 26 and the first and second outflow pipes 28A and 28B corresponding to the pipe-fitting bottomed hole 29 are bent to form steps 30a, thereby forming a surface 30b which is separated away from the pipe-mounting surface 13f of the valve seat plate 13. Through holes 30c, which are brought into tight contact with outer diameters of the inflow pipe 26 and the first and second outflow pipes 28A and 28B and have projections which support the pipes, are provided at positions aligning with the pipe-fitting bottomed holes 29. Through holes 30d into which the supporting shafts 18, 21A and 21B are loosely fitted are formed in positions of the valve seat plate 13 corresponding to the center hole 13b and the supporting shaft fixing hole 13c.

Total three shafts, i.e., the rotor supporting shaft (common gear supporting shaft) 18 and the two driven gear supporting shaft 21A and 21B are press-fitted into the center hole 13b and the supporting shaft fixing holes 13c from the side of the pipe-mounting surface 13f of the valve seat plate 13. Further, the three pipes, i.e., the inflow pipe 26 and the first and second outflow pipes 28A and 28B are fitted into the through holes 30c of the pipe supporting plate 30 uprightly. End surfaces of the pipes are allowed to seat on the bottomed holes 29 formed by denting the pipe-mounting surface 13f of the valve seat plate 13. Six portions to which the total six members are to be mounted from outside are welded or brazed from the pipe-mounting surface 13f on the opposite side from the valve seat 23 to ensure the air-tightness. A long distance between the pipes can be obtained, and all of the inflow pipe 26 and the outflow pipes 28A and 28B are disposed on the same pipe-mounting surface 13f. Therefore, assembling and brazing operation from the same direction are facilitated, and the operability is enhanced and thus, the quality is stabilized.

Figure 2:
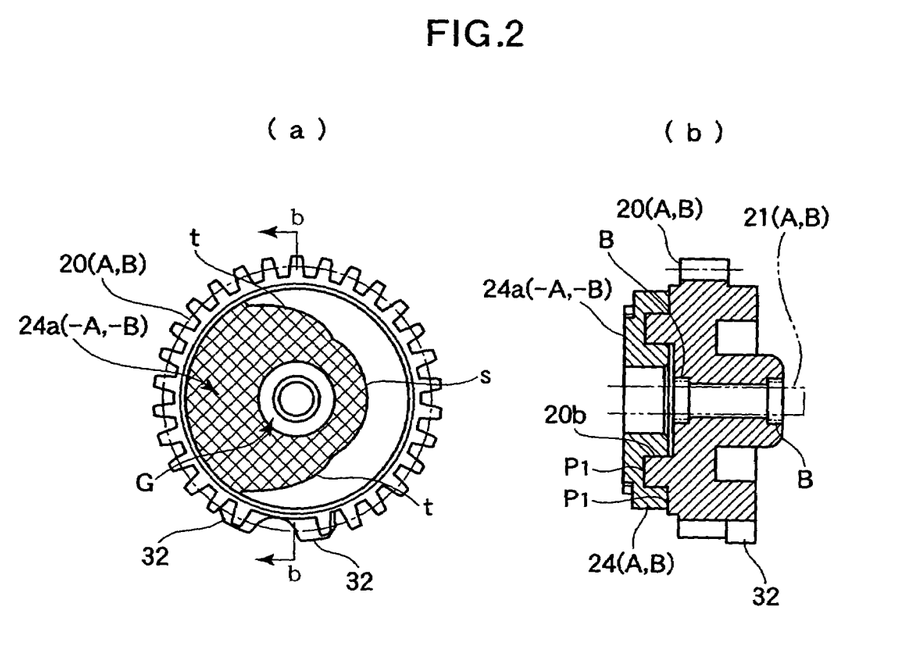
FIG. 2 are plan view showing a relation between a driven gear and a valve body in the valve driving device of the invention.
Figure 3:
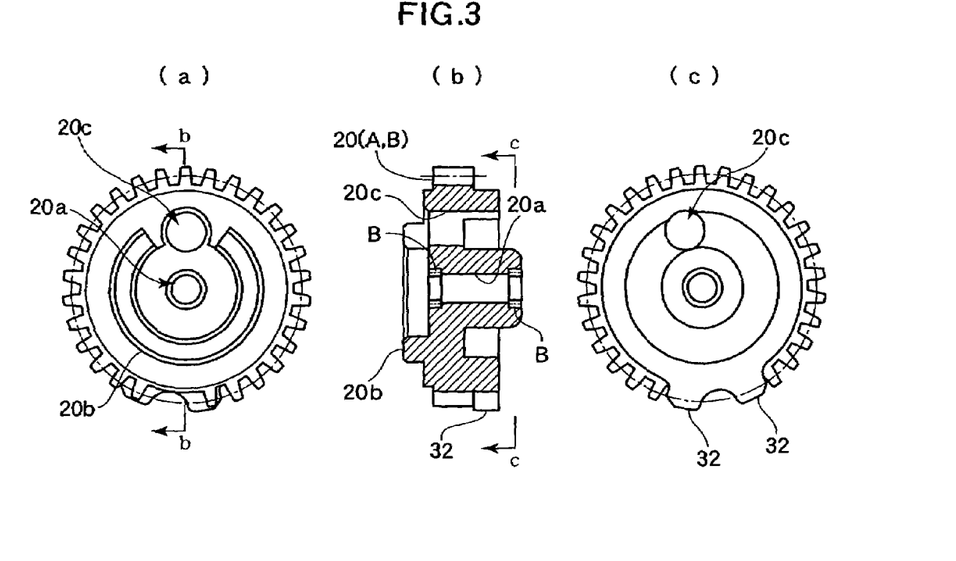

FIG. 2(a) is a plan view the combined valve body 24 (A, B) and the driven gear 20 (A, B) taken along a line II—II in FIG. 1 as viewed from the valve seat. FIG. 2(b) is a sectional view taken along a line b—b in FIG. 2(a). FIG. 3(a) is a plan view the driven gear 20 (A, B), and FIG. 3(b) is a sectional view taken along a line b—b in FIG. 3(a). FIG. 3(c) is a back view taken along a line c—c in FIG. 3(b). A portion of teeth of the driven gear 20 (A, B) are cut and a projection 32 which can not mesh with the rotor pinion 17 of the common gear is provide. With this structure, it is possible to limit the rotation of the driven gear 20 (A, B) and to set an original point of actuation.

The driven gear 20 (A, B) is formed with a through hole 20a into which the supporting shaft 21 (A, B) is loosely fitted. Bearing bushes B which are rotatably slide contacted with the supporting shaft 21 (A, B) are press-fitted into the opposite openings. The driven gear 20 includes an engaging projecting edge 20b which is fitted into the annular groove 24d of the valve body 24 (A, B) to limit the radial direction and which presses at its abutting surface, and a fitting hole 20c which receives the driving pin 24b which rises from the valve body 24 (A, B). The driven gear 20 (A, B) brings the valve body 24 (A, B) into contact with the valve seat 23 under pressure and rotates around the supporting shaft 21 (A, B) integrally with the valve body 24 (A, B).

Figure 4:
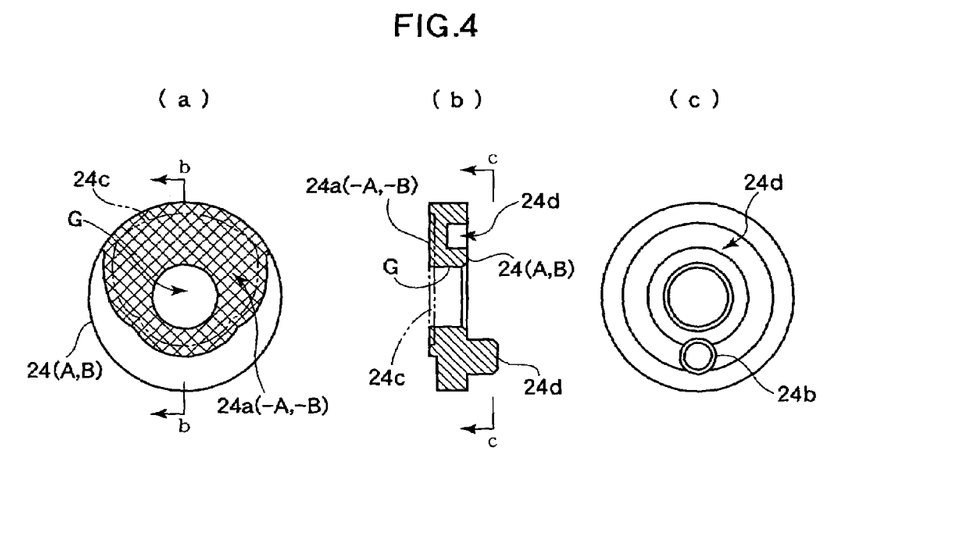

FIG. 4(a) is a plan view of the valve body 24 (A, B), and FIG. 4(b) is a sectional view taken along a line b—b in FIG. 4(a). FIG. 4(c) is a back view taken along a line c—c in FIG. 4(b). A shaft right angle surface of the valve body 24 (A, B) and the sliding surface 24a (A, B) shown with cross hatching are provided with steps. The sliding surface 24a (A, B) comes into tight contact and slides with the smooth valve seat surface 13e which is dented in the valve seat plate 13. Therefore, in the communication holes 25A and 25B which are completely covered with sliding surfaces 24a (-A, -B), flow-paths communicating with outflow pipes 28A and 28B from the valve chamber 22 are closed and completely insulated from the inflow pipe 26. A region shown with a symbol s in a step pattern of the sliding surface 24a (-A, -B) is an arc which is concentric with the supporting shaft 21 (A, B), and the communication holes 25A and 25B are maintained in their fully opened state. Opposite sides of the region s are region defined by heart cam curves (Archimedean spiral) t, and region in which the communication holes 25A and 25B are gradually opened and closed in proportion to a rotation angle of the driven gear 20 (A, B).

A diameter of a central portion of the valve body 24 (A, B) is increased larger than an outer diameter of the supporting shaft 21 (A, B) to form a space portion G. For this reason, if the valve body 24 (A, B) receives a pressure from the driven gear 20 (A, B), the sliding surface 24a (-A, -B) follows the driven gears 20A and 20B and rotates while keeping the alignment with the valve seat plate 13 without braking the tight contact state. The space portion G reduce the sliding surface 24a (-A, -B) and increases the abutment surface pressure, but a rib 24c (shown with a phantom line) is provided along an outline of an outer periphery of the space portion G, and a surface which does not come into sliding contact with the valve seat 23 is dented inward.

Therefore, a contact surface area between the projecting surface of the rib 24c and the valve seat 23 is reduced and pressure is increased and the adhesion can be enhanced. The space portion G can maintain the adhesion of a necessary portion in the sliding surface 24a (-A, -B) without being affected by inconvenience of the flatness generated when the supporting shaft 21 (A, B) is press-fitted or ooze of welding braze at a root portion of the supporting shaft 21 (A, B).

If the valve body 24 (A, B) is separated from the driven gear 20 (A, B) in this manner, it is possible to form the sliding portion into uniform shape and thickness, and necessary flatness and surface relative roughness can be secured in the sliding surface 24a (-A, -B). The driven gear 20 (A, B) can effectively press the valve body 24 (A, B) at least at a point P1 of the engaging projecting edge 20b or a point P2 in the vicinity of the tooth root which is located at an outer side of the point P1. Further, the valve body 24 (A, B) can be formed by a mold which can easily form a smooth surface, and a material of the valve body 24 can freely be selected, and the valve body 24 can be molded with appropriate hardness and elasticity. Therefore, the valve body 24 can be formed of rubber-based NBR or H-NBR having excellent adhesion of its own elasticity.

Figure 5:
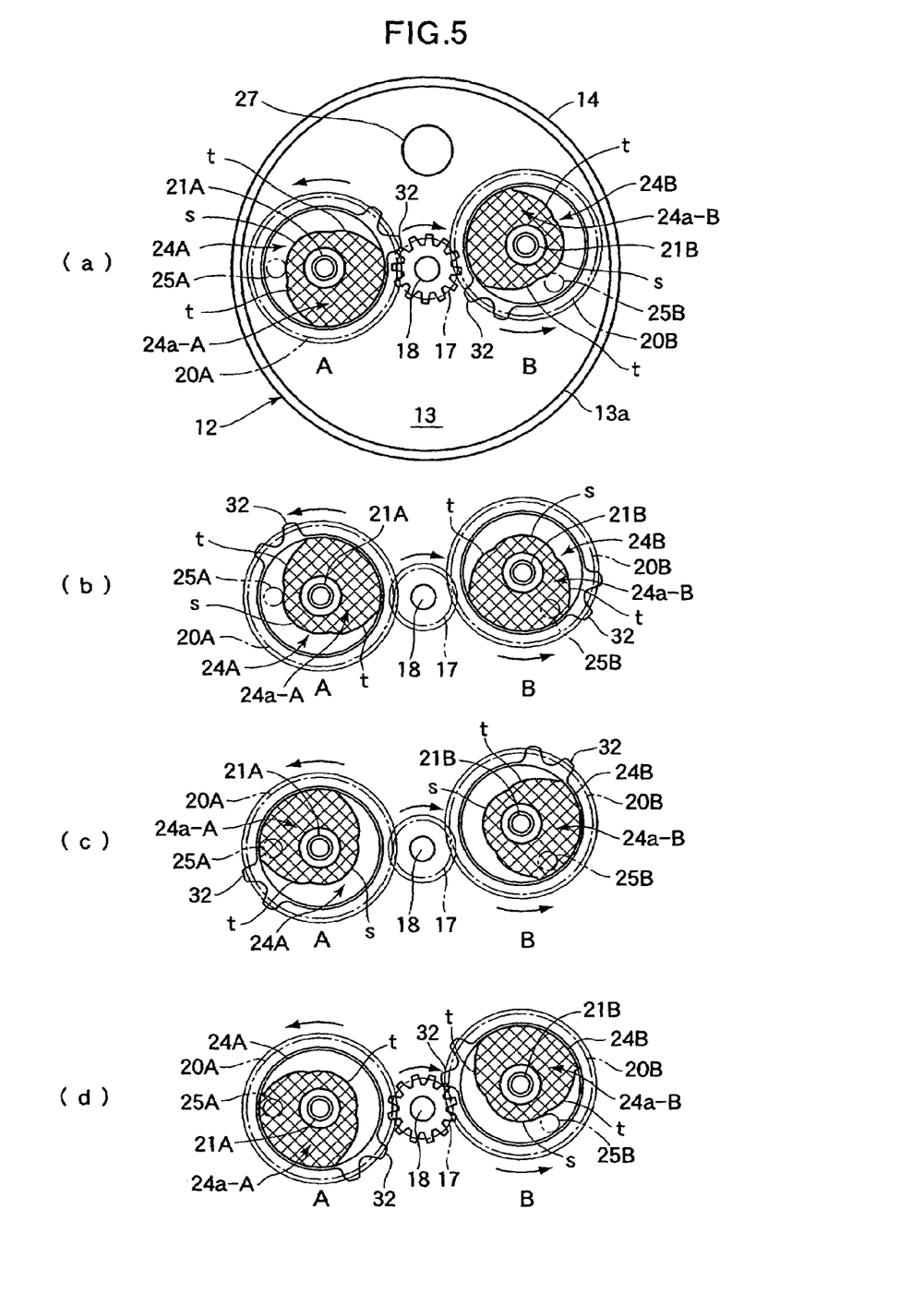
FIG. 5 are explanatory views of a valve body open/close mode in the valve driving device of the invention.

FIG. 5 show open/close modes, through the valve seat plate 13, of the first communication hole 25A and the second communication hole 25B controlled by the first valve body (A) 24A and the second valve body (B)24B. FIG. 5(a) shows that both the first communication hole 25A and second communication hole 25B are opened. FIG. 5(b) shows that the first communication hole 25A is opened and the second communication hole 25B is closed. FIG. 5(c) shows that both the first communication hole 25A and second communication hole 25B are closed. FIG. 5(d) shows that the first communication hole 25A is closed and the second communication hole 25B is opened. Outline patterns which define outer shapes of the valve bodies 24 (A, B) by steps with respect to the driven gears 20A and 20B have directional property. Therefore, it is necessary to set relative positional relation of rotation angles of the two valve bodies 24A and 24B in the four modes with respect to the first communication hole 25A and the second communication hole 25B.

Figure 6:
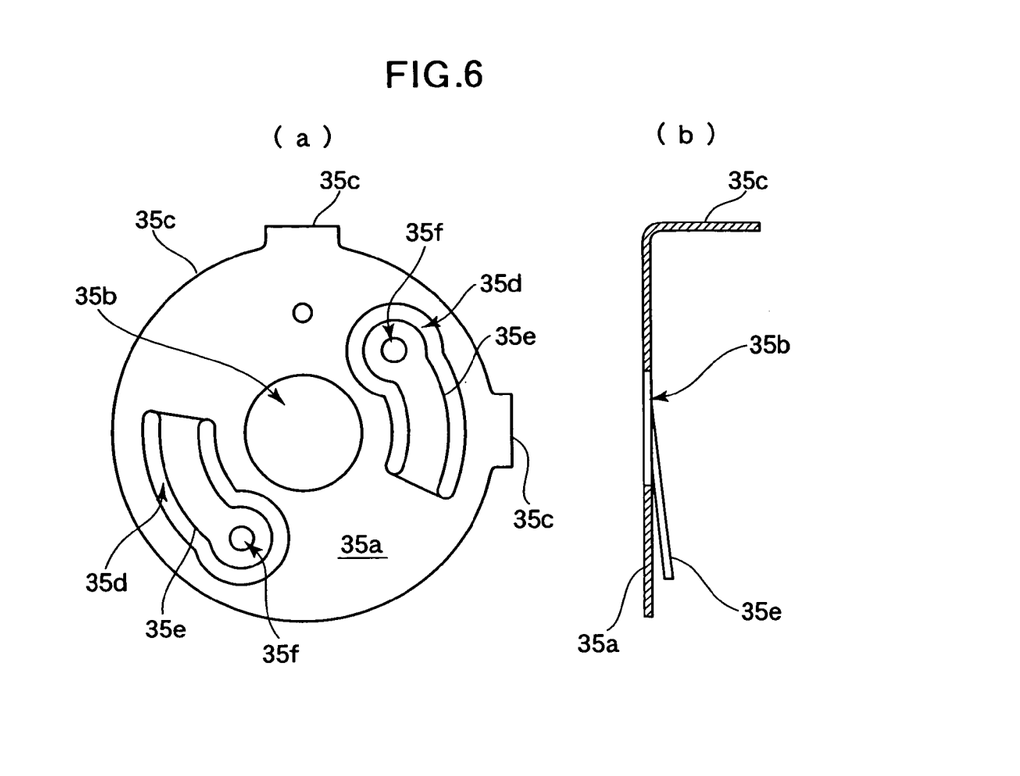

In order to bring the valve body sliding surfaces 24a-A, 24a-B which are integrally formed on the driven gears 20A and 20B into tight contact with the valve seats 23, one leaf spring member 35 is mounted to an upper surface of each of the driven gears 20A and 20B such that the leaf spring member 35 is resiliently in contact with the upper surface thereof. The leaf spring member 35 has a disk-like shape as shown in FIG. 6(a), and a base body 35a is provided at its central portion with a penetrating hole 35b into which the rotor pinion 17 can easily be inserted. Band-like portions radially extending from portions of outer edges of the leaf spring member 35 are bent from their roots, and a leg portion 35c for holding the base body 35a is formed on a position separated from the valve seat plate 13 as shown in FIG. 6(b). Two branch arms 35e having independent elasticity are extended from the base body 35a by notches 35d formed along circumferences which are symmetric with respect to a center of the penetrating hole 35b.

Figure 7:
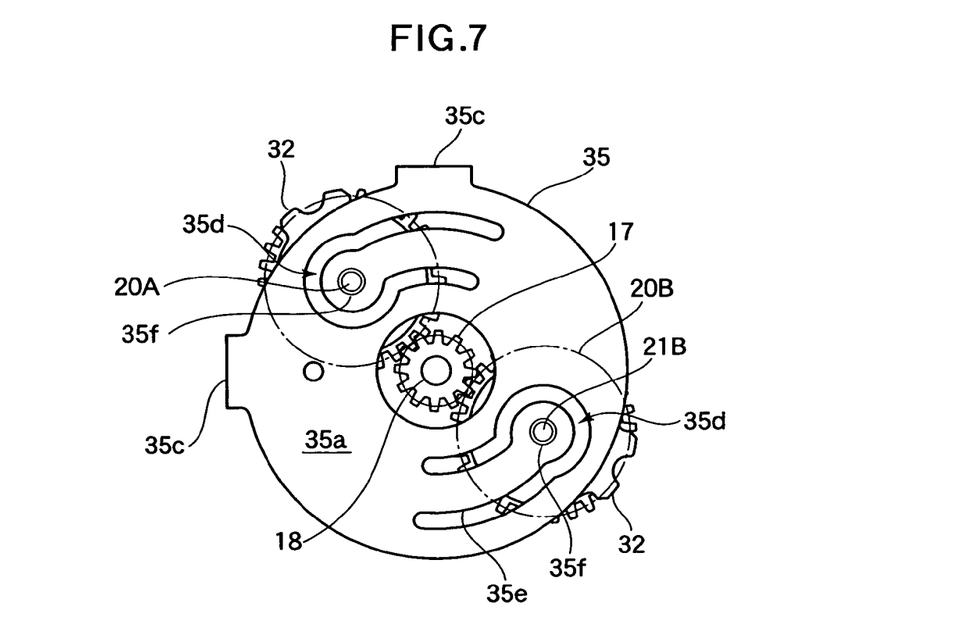
FIG. 7 is a plan view of a partial assembly of the leaf spring member and a driven gear in the valve driving device of the invention.

As shown in FIG. 7, tip ends of the supporting shafts 21A and 21B are inserted through holes 35f formed in free ends of the branch arms 35e. Next, the rotor 15 which is integrally formed on the rotor pinion 17 is inserted into the supporting shaft 18 which is fixed to a central portion of the valve seat plate 13, the rotor pinion 17 which is a common gear is reliably meshed with the driven gears 20A and 20B, thereby assembling the rotor 15. Then, a portion of the valve seat plate 13 on the side of the valve seat 23 including the rotor 15 is entirely covered with the hermetically sealed case 14, the reduced-diameter peripheral edge portion 13a of the valve seat plate 13 is fitted into an inner surface of the opened end 14b of the hermetically sealed case 14, they are integrally sealed using TIG welding, thereby forming the air-tight valve chamber 22.

Since the outer edge of the base body 35a of the leaf spring member 35 is pressed by an inner surface of the widened step 14c of the hermetically sealed case 14 and moved downward, free ends of the branch arms 35e resiliently bias the driven gears 20A and 20B from their upper surfaces and thus, the valve body sliding surface 24a-A, 24a-B can be simultaneously brought into tight contact with the valve seat 23 by the one leaf spring member 35. In the hermetically sealed case 14, an upper end of the rotor 15 is pressed by a washer 38 provided on an outer periphery of the recess 14a which supports one end of the rotor supporting shaft 18 on the closed end side of the hermetically sealed case 14, and the case 14 pushes the spring washer 38 through a collar 37 fitted into a lower surface of the rotor pinion 17. That is, since an axial clearance of the rotor 15 is absorbed by resilient deformation of the spring washer 38, it is possible to ensure smooth rotation of the rotor 15 without rattle.

Figure 8:
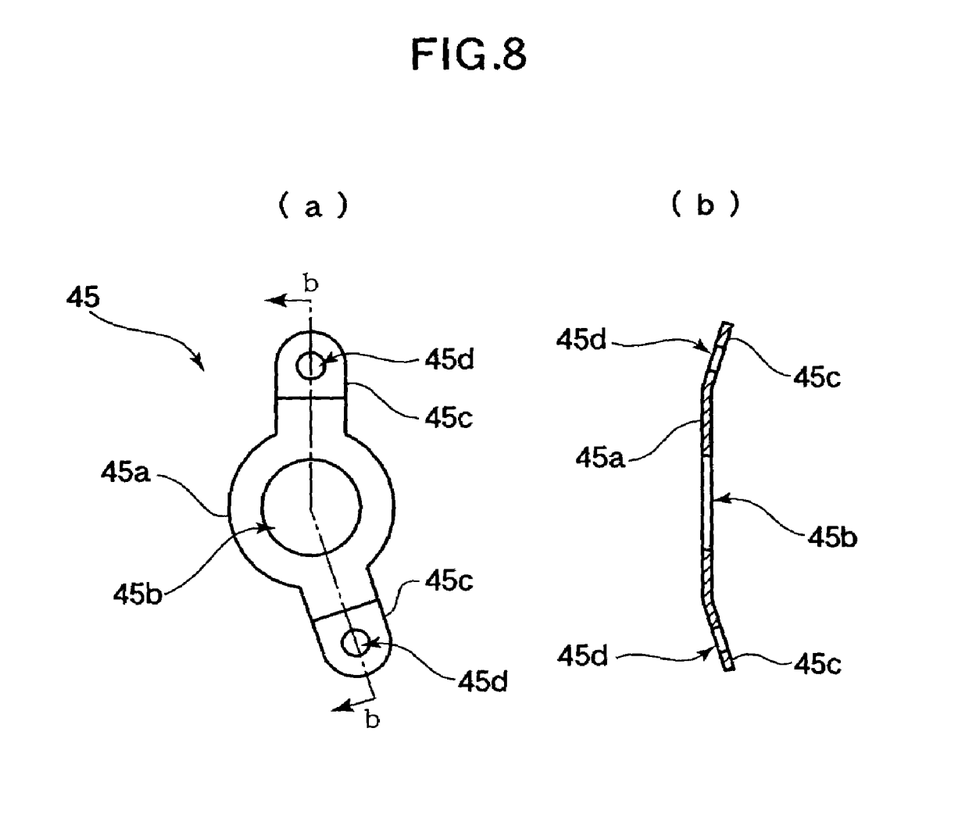

FIG. 8 show a shape of another leaf spring member 45. FIG. 8(a) is a plan view and FIG. 8(b) is a sectional view taken along a line b—b in FIG. 8(a). A leaf spring member 45 includes branch arms 45c radially extending from an outer periphery of an annular base body 45a formed at its central portion with a penetrating hole 45b. Through holes 45d are formed in free ends of the branch arms 45c for inserting the corresponding supporting shafts 21(A, B). An inner diameter of the central penetrating hole 45b of the annular base body 45a is larger than the rotor pinion 17 so that the rotor pinion 17 can easily be inserted therethrough, but is smaller than the diameter-increased portion 17a provided on an upper portion of the rotor pinion 17 so that the diameter-increased portion 17a can not be inserted therethrough. In the embodiment using the leaf spring member 45, the leaf spring member 45 is mounted in the same manner as that of the leaf spring member 35, and the corresponding supporting shafts 21(A, B) are respectively inserted through the through holes 45d.

Figure 9:
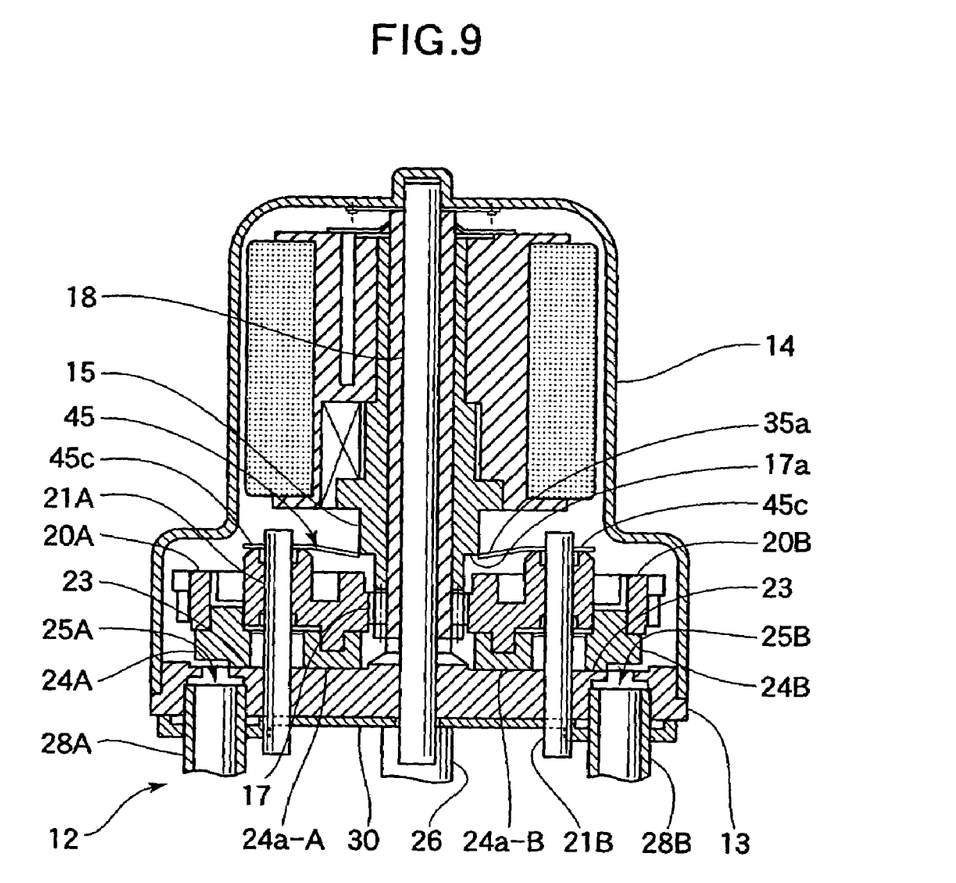
FIG. 9 is a sectional view of the assembled leaf spring member shown in FIG. 8 in the valve driving device of the invention.

Then, the rotor 15 which is integrally formed on the rotor pinion 17 is inserted into the supporting shaft 18 which is fixed to the central portion of the valve seat plate 13, and the rotor pinion 17 which is a common gear is reliably meshed with the driven gears 20A and 20B, thereby assembling the rotor 15. As a result, the diameter-increased step 17a of the upper portion of the rotor pinion 17 is engaged with the central penetrating hole 45b of a leaf spring member base body 45a and pushes the leaf spring member base body 45a downward. Therefore, the free ends of the branch arms 45c resiliently bias the driven gears 20A and 20B from their upper surfaces and thus, the valve body sliding surface 24a-A, 24a-B can be simultaneously brought into tight contact with the valve seat 23 by the one leaf spring member 45 (see FIG. 9). The driving member constructed in this manner is covered with the hermetically sealed case 14, the reduced-diameter peripheral edge portion 13a of the valve seat plate 13 is fitted into the inner surface of the opened end 14b, and they are integrally sealed using TIG welding, thereby forming the air-tight valve chamber 22 as in the above embodiment.

Figure 10:
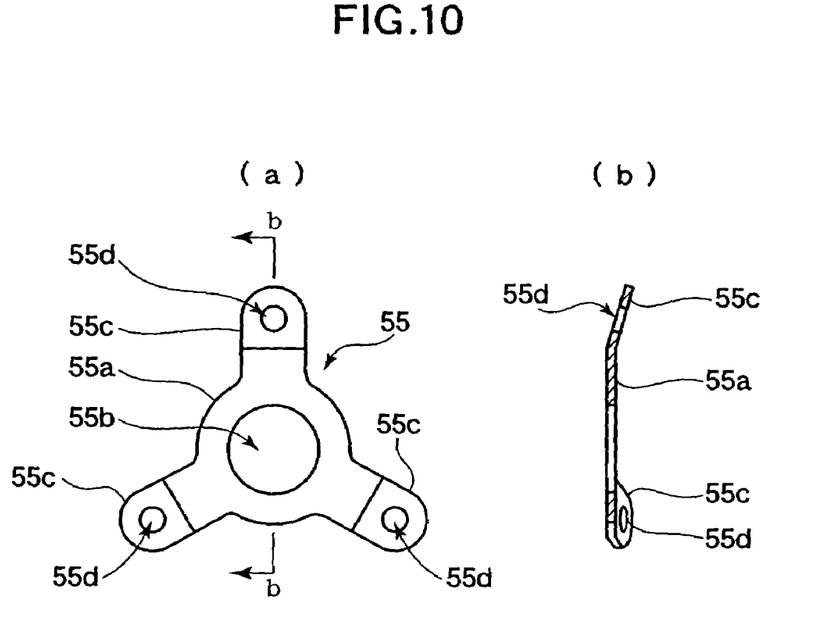

From the shape of the leaf spring member 45, it is easy to estimate a leaf spring member 55 which can be applied to a four-way valve (not shown) as shown in FIG. 10. FIG. 10(a) is a plan view and FIG. 10(b) is a sectional view taken along a line b—b in FIG. 10(a). That is, like the leaf spring member 45, the leaf spring member 55 includes has an annular base body 55a provided at its central portion with a penetrating hole 55b through which the rotor pinion 17 can pass but the diameter-increased step 17a on the upper portion of the pinion can not pass. Three branch arms 55c radially project from an outer periphery of the annular base body 55a in correspondence with positions of the driven gear supporting shafts. An upper end of each of the driven gear supporting shafts is inserted through the through hole 55d formed in the free end of each branch arm 55c. By radially disposing, at equal distances from one another, the communication holes which are in communication with outflow pipes of the four-way valve, it is possible to uniformly press the valve bodies which control the opening/closing control through the driven gear by the one leaf spring member 55. The air-tight valve chamber 22 can be formed by the hermetically sealed case 14 like the above embodiment and thus, explanation thereof is omitted.

The embodiments based on the three-way valve to which the valve driving device according to the present invention have been explained above, but the invention is not limited to the illustrated embodiments. It is expected that the shapes and structures thereof can variously be changed and the parts can variously be reconstructed concerning detailed portions within a range not departing from the essential constituent requirements of the present invention.

INDUSTRIAL APPLICABILITY

As apparent from the above explanation, according to the valve driving device of the invention, the valve body is formed separately from the driven gear, and the valve body is held by the driven gear. Since the valve body is formed separately from the driven gear, it is possible to design the valve body while assigning the highest priority to adhesion with respect to the valve seat. When a material which can easily adhere is selected or the valve body is formed of resin or rubber, it is possible to select its shape while taking a sink mark which may be caused by molding into consideration, the contact portion can be formed into uniform shape and thickness. Therefore, precision of the adhering surface can be secured. Further, since the volume of the valve body can be reduced, expensive resin which can withstand the change of kinds of refrigerant or using pressure can be used for the valve body.

What is claimed is:

1. A valve driving device comprising:
   a plurality of openings having an inflow pipe into which fluid flows and an outflow pipe from which fluid flows, the inflow pipe and outflow pipe forming a portion of a flow-path and being connected to an interior of the plurality of openings;
   a plurality of valve bodies, each of which is brought into tight contact with a peripheral edge of a corresponding one of the plurality of openings and is rotated to open or close the corresponding opening, thereby interrupting or permitting the flow of the fluid; and
   driving means for driving the plurality of valve bodies, the driving means including a common gear and a plurality of driven gears driven by the common gear, each of the plurality of driven gears corresponding to one of the plurality of valve bodies, wherein the plurality of valve bodies are formed separately from the plurality of driven gears and are held on axial end surfaces of the plurality of driven gears, and the plurality of driven gears rotate the plurality of valve bodies to open or close the fluid flow-path.

2. A valve driving device according to claim 1, wherein each of the plurality of openings is closed by a rib.

3. A valve driving device according to claim 1, wherein the driven gears are disposed symmetrically with respect to a rotating shaft of the common gear, and the valve device further comprises an elastic member which commonly biases the driven gears.

4. A valve driving device according to claim 1, wherein each of the plurality of valve bodies is made of rubber or equivalent synthetic resin.

5. A valve driving device according to claim 1, wherein each of the plurality of valve bodies is made from NBR or NBR hydride.

6. A valve driving device according to claim 1, wherein each of the plurality of valve bodies has a central space portion whose diameter is greater than an outer diameter of a supporting shaft.

* * * * *